United States Patent [19]

Torigai

[11] Patent Number: 4,827,722
[45] Date of Patent: May 9, 1989

[54] ENGINE WITH TURBO-CHARGER FOR AN OUTBOARD MOTOR

[75] Inventor: Katsumi Torigai, Hamamatsu, Japan

[73] Assignee: Sanshin Kogyo Kabushiki Kaisha, Hamamatsu, Japan

[21] Appl. No.: 177,843

[22] Filed: Mar. 28, 1988

Related U.S. Application Data

[63] Continuation of Ser. No. 870,460, Jun. 4, 1986, abandoned.

[30] Foreign Application Priority Data

Jun. 5, 1985 [JP] Japan .................................. 60-120528

[51] Int. Cl.⁴ ........................ F02B 37/00; F02B 29/04
[52] U.S. Cl. .................................... 60/599; 60/605.1; 60/612
[58] Field of Search .................. 60/599, 605, 612; 123/563

[56] References Cited

U.S. PATENT DOCUMENTS

| | | | |
|---|---|---|---|
| 4,028,892 | 6/1977 | Hinkle | 60/599 |
| 4,104,999 | 8/1978 | Ullrich | 123/563 |
| 4,565,177 | 1/1986 | Roettgen | 123/563 |
| 4,630,446 | 12/1986 | Iwai et al. | 60/605 X |

FOREIGN PATENT DOCUMENTS 1326503 8/1973 United Kingdom ................. 60/599

*Primary Examiner*—Michael Koczo
*Attorney, Agent, or Firm*—Ernest A. Beutler

[57] ABSTRACT

An outboard motor having a turbo-charged internal combustion engine as a power device. The engine is provided with a plurality of carburetors that draw air through a common plenum chamber. The turbo-chargers deliver pressurized air to the plenum chamber and an intercooler is formed in the plenum chamber by having a heat exchanger extending across the plenum chamber. The intercooler is cooled by circulating engine coolant through it.

8 Claims, 3 Drawing Sheets

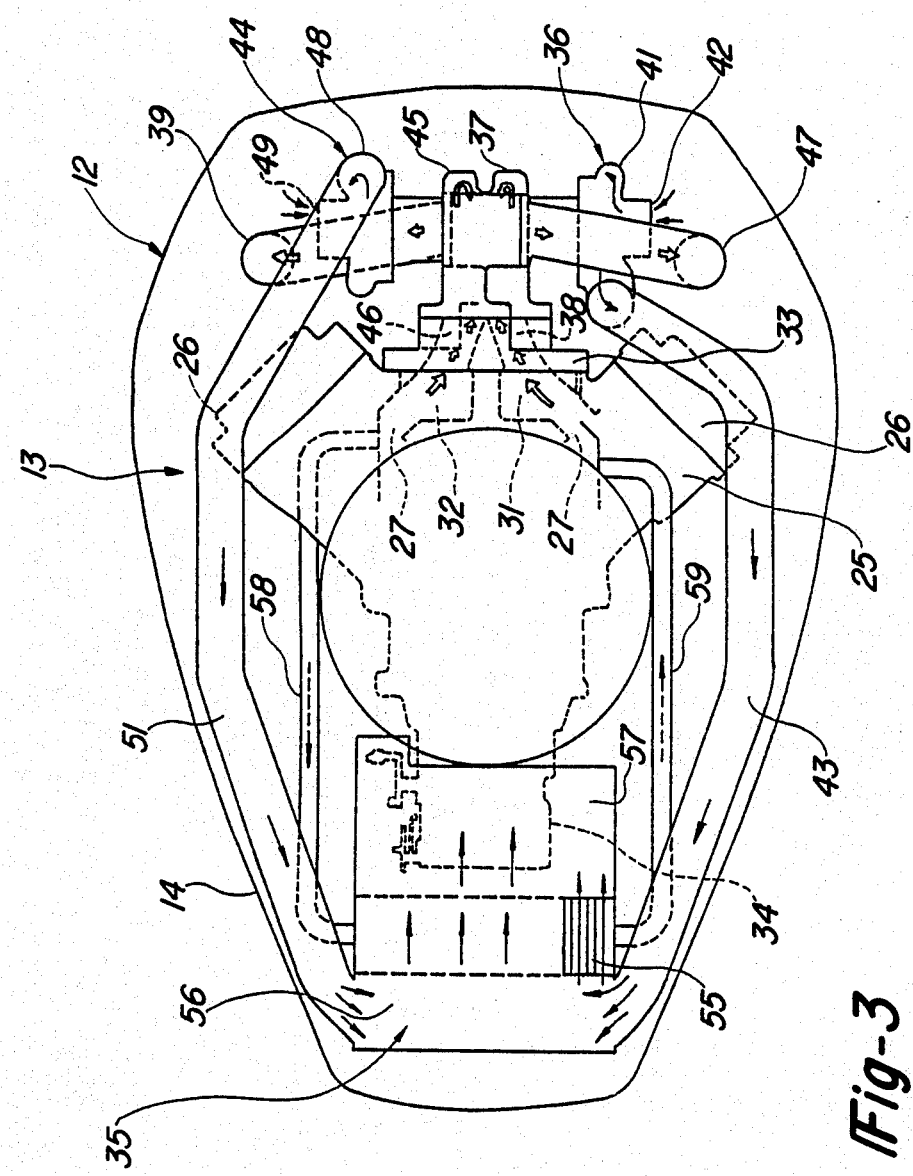

ENGINE WITH TURBO-CHARGER FOR AN OUTBOARD MOTOR

This is a continuation of U.S. patent application Ser. No. 870,460, filed June 4, 1986, abandoned.

BACKGROUND OF THE INVENTION

This invention relates to an engine with a turbo-charger and more particularly to an improved arrangement for turbo-charging and intercooling an internal combustion engine in such a manner that it may be used as the power unit of an outboard motor.

The use of turbo-chargers to improve the performance of an internal combustion engine is well known. The turbo-charger includes a turbine stage which is driven by the engine exhaust gases and which drives a compressor stage for compressing the air charge delivered to the engine induction system. Because the compressor stage compresses the intake charge, however, it also tends to raise the temperature of the intake charge and thus offsets some of the advantages of its utilization. In order to avoid this temperature raise and loss of volumetric efficiency, it has been proposed to employ an intercooler for cooling a compressed air charge before it is delivered to the engine induction system.

A specific application of turbo-charging may be found in the power unit of an outboard motor. Such power units are normally two-cycle engines and these engines adapt themselves particularly to turbo-charging. In addition, the very nature of an outboard motor requires that the power unit be very small and yet develop a relative high amount of horsepower for a given size. However, with the additional of an intercooler, it becomes very difficult to position all of the components for the engine. In addition, if the engine employs an air silencer, the turbo-charger must be separately positioned and conduits need to be provided in order to deliver air to the intercooler and air from the intercooler to the air silencer. In addition, hose connections are required for delivering coolant to the intercooler and these connections, particularly the pressure connections on the air side, if they fail, can cause significant problems.

It is, therefore, a principal object of this invention to provide an improved and compact arrangement for turbo-charging and intercooling an internal combustion engine.

It is a further object of this invention to provide an arrangement wherein an engine having an air inlet device may be intercooled through the use of an intercooler that is formed integrally with the air inlet device and thus reduce the amount of external hose connections that are required.

SUMMARY OF THE INVENTION

This invention is adapted to be embodied in an internal combustion engine having an induction system having an inlet and a plenum chamber surrounding the inlet. A supercharger is provided that has an output for delivering pressurized air to the plenum chamber upstream of the induction system inlet. An intercooler is contained within the plenum chamber and is interposed between the point of introduction of air from the supercharger and the induction system inlet.

BRIEF DESCRIPTION OF THE DRAWINGS

FIG. 3 is an enlarged top plan view of the power head.

DETAILED DESCRIPTION OF THE PREFERRED EMBODIMENT

Figure 1:
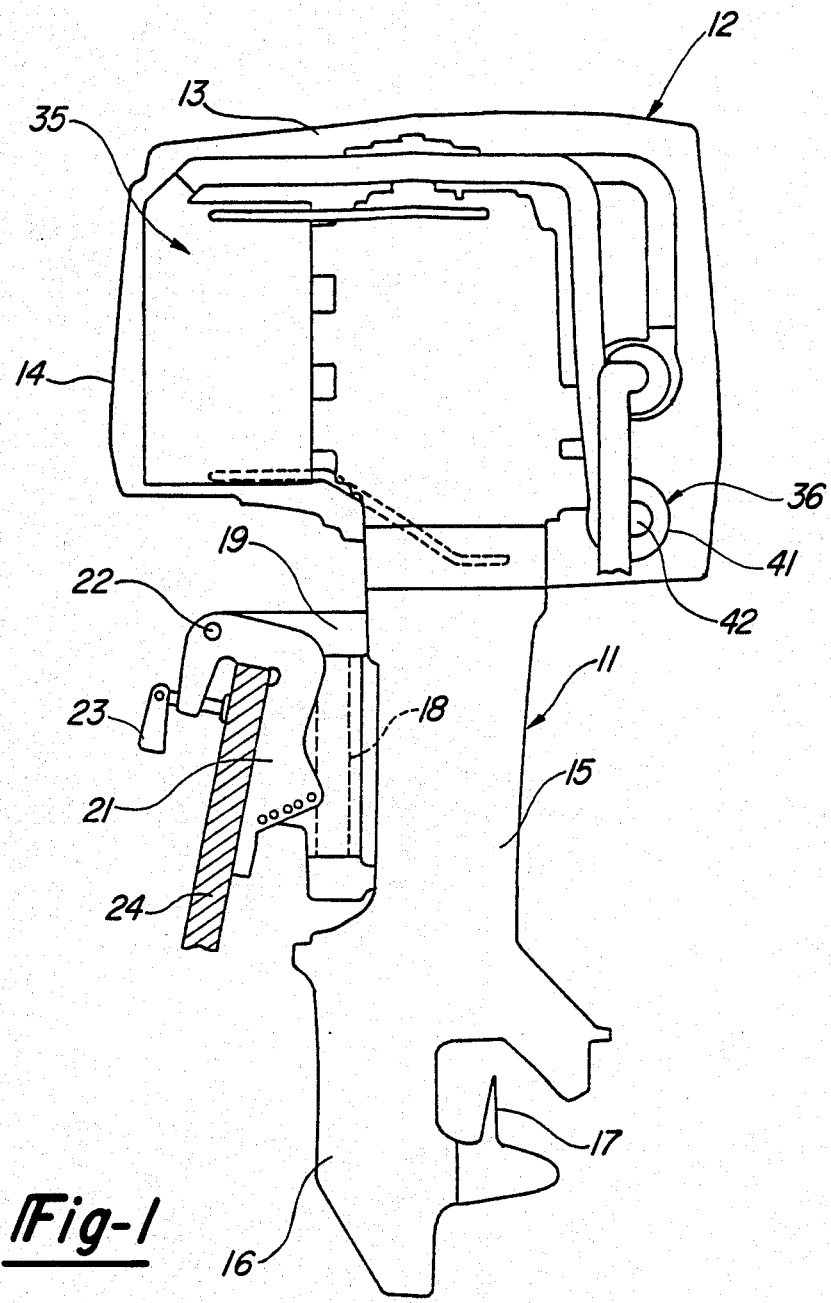
FIG. 1 is a side elevational view of an outboard motor constructed in accordance with an embodiment of the invention with portions broken away.
Figure 2:
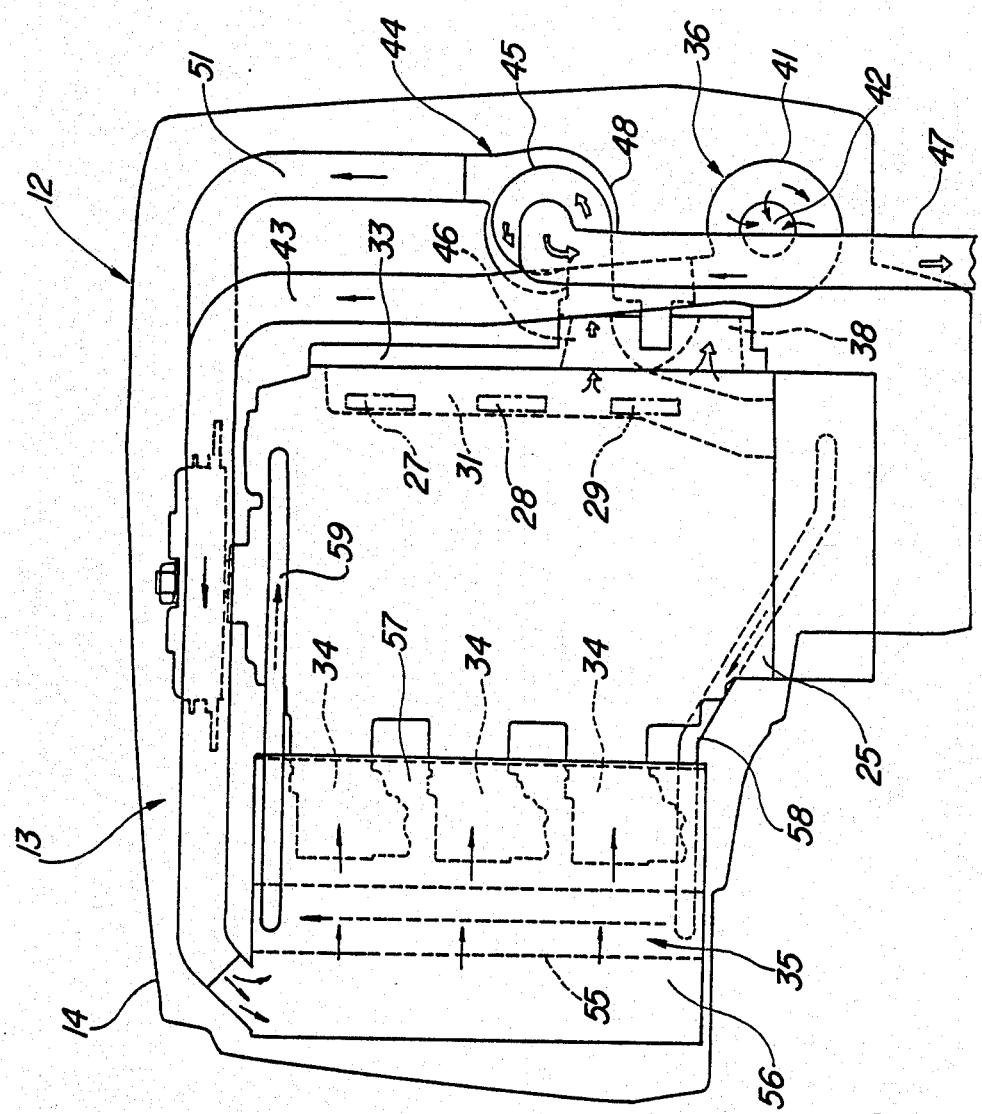
FIG. 2 is an enlarged side elevational view of the power head of the outboard motor.

An outboard motor constructed in accordance with an embodiment of the invention is identified generally by the reference numeral 11. It is to be understood that, although the invention is described in conjunction with an outboard motor, certain facets of it may be employed in connection with other types of power units. However, the invention has particular utility in connection with outboard motors due to their extremely compact nature.

The outboard motor 11 includes a power head, indicated generally by the reference numeral 12, and which includes an internal combustion engine 13, to be described in more detail, and a surrounding protective cowling 14. The engine 13 is disposed so that its output shaft extends in a generally vertical direction and drives a drive shaft that is rotatably supported in a drive shaft housing 15. This drive shaft extends into a lower unit 16 where it drives a forward, neutral, reverse transmission for powering a propeller 17.

A steering shaft 18 is affixed in a suitable manner into the drive shaft housing 15 and is rotatably journaled within a swivel bracket 19 for steering of the outboard motor 11. The swivel bracket 19 is, in turn, pivotally connected to a clamping bracket 21 by means of a horizontally extending pivot pin 22 so as to permit tilting of the outboard motor 11 about the axis of the pivot pin 22. A clamping assembly 23 is carried by the clamping bracket 21 for affixing the outboard motor 11 to a transom 24 of an associated watercraft.

The construction of the outboard motor 11 as thus far described may be considered to be conventional and of any known construction and, for that reason, such components as the drive shaft, its manner of drive, the forward, neutral, reverse transmission and the mechanism for driving the propeller 12 have not been illustrated.

The engine 13 is depicted as being of the two-cycle, crankcase compressed V type having a cylinder block 25 that defines a pair of angularly disposed cylinder block portions in which vertically spaced cylinders are formed. The upper ends of the cylinders are closed by cylinder heads 26 in a known manner. In the illustrated embodiment, each cylinder bank has three cylinders so that the engine 13 is of the V6 type. In the valley of the V, the cylinders of each bank are provided with respective exhaust ports 27, 28, and 29. The ports of one of these banks discharge into a first generally vertically extending exhaust passage 31 while the ports of the other bank extend into a parallel vertically extending exhaust passage 32. The upper or outer ends of the exhaust passages 31 and 32 are closed by an exhaust cover plate 33.

The side of the engie opposite to the exhaust passages 31 and 32 comprises the intake side wherein a charge is formed for introduction into the separately sealed crankcase chambers of the engine. For this purpose, there are provided a plurality of vertically spaced carburetors 34 which form a fuel/air charge for introduction to the individual crankcase chambers through an appropriate intake manifold and reed type check valves. The carburetors 34 are surrounded by an air inlet device, indicated generally by the reference numeral 35, and which may be considered to comprise an enlarged plenum chamber that provides a silencing effect for the intake charge.

In accordance with the invention, a turbo-charger arrangement is provided for delivering a pressurized fuel/air charge to the intake device 35 and the induction system of the engine. This arrangement includes a first turbo-charger, indicated generally by the reference numeral 36, that has a turbine stage 37 which has an exhaust inlet opening 38 which communicates with the exhaust passage 31 for delivering exhaust gases to the turbine stage 37 for driving it. These exhaust gases are discharged from the turbine stage 37 to an exhaust pipe 39 that extends along the opposite side of the engine.

The turbo-charger 36 further includes a compressor stage 41 that draws fresh air from within the protective cowling 14 through an inlet opening 42. Atmospheric air is delivered to the area of the interior of the protective cowling 14 through any suitable air inlet, as is well known with outboard motors. The compressed air charge from the compressor stage 41 is delivered to the intake device 35 through a conduit 43 that extends along one side of the engine 13.

A second turbo-charger, indicated generally by the reference numeral 44, is also provided for the engine 13. By providing two smaller turbo-chargers rather than a single large turbo-charger, better throttle response may be achieved as is well known. The turbo-charger 44 has a turbine stage 45 having an exhaust inlet 46 that communicates with the exhaust passage 32 for driving the turbine stage 45. The exhaust gases are discharged from the turbine stage 45 through an exhaust discharge conduit 47.

The turbine stage 45 drives a compressor stage 48 which draws fresh air from within the protective cowling 14 through a sidewardly opening air inlet 49. The compressed air is delivered from the compressor stage 48 to the intake device 35 by means of a conduit 51 that extends along the side of the engine 13 opposite to the conduit 43.

In further accordance with the invention, an intercooler 55 is positioned integrally within the inlet device 35 and divides the inlet device 35 into an upstream section 56 and a downstream section 57. The intercooler 55 is provided with fins that define a plurality of generally axially extending air flow passages from the inlet side 56 to the outlet side 57 where they may communicate with the carburetors 34. In addition, the intercooler 55 is provided with transversely extending coolant passages that receive coolant from the cooling jacket of the engine 13 through a coolant delivery passage 58 and for return to the engine cooling jacket through a coolant return line 59. Flow of coolant through the intercooler 55 is transverse to the flow of air through it.

It should be readily apparent that the illustrated and described construction provides a very compact arrangement wherein the intercooler is removed from the exhaust manifold of the engine and is contained conveniently and integrally within the plenum chamber of the air inlet device so as to reduce the amount of external plumbing required. In addition, a very compact arrangement is achieved without any sacrifice of cooling of the intake air.

Although an embodiment of the invention has been illustrated and described, it is to be understood that various changes and modifications may be made without departing from the spirit and scope of the invention, as defined by the appended claims.

I claim:

1. An outboard motor for propelling a watercraft through a body of water, said outboard motor comprising an internal combustion engine having an output shaft, clamping means for fixing said outboard motor to a transom of the watercraft with said output shaft rotating about a vertically extending axis lying within a vertically extending transverse plane, propulsion means carried beneath said engine and driven by said output shaft, said propulsion means having means for cooperating with the water of said body of water for driving the watercraft therethrough, said engine having a plurality of vertically spaced, horizontally disposed cylinders lying on one side of said transverse plane, an induction system having an inlet lying on the other side of said transverse plane, a plenum chamber surrounding said inlet, a turbocharger having a turbine stage and having a compression stage with an outlet, said turbocharger being positioned on the one side of said transverse plane, conduit means extending from said outlet across the top face of said engine and across said transverse plane for delivering pressurized air to an inlet of said plenum chamber upstream of said induction system inlet, an intercooler extending in a vertical plane along said one vertical side of said engine and contained within said plenum chamber and interposed between the point of induction of air from said supercharger and said induction system inlet, and a protective cowling encircling said engine, said supercharger and said plenum chamber.

2. An outboard motor as set forth in claim 1 wherein the induction system includes a plurality of carburetors each having an inlet forming the induction system inlet, the plenum chamber surrounding all of said carburetor inlets.

3. An outboard motor as set forth in claim 2 wherein the intercooler has a cooling medium flowing therethrough in a direction transverse to the direction of air flow.

4. An outboard motor engine as set forth in claim 3 wherein the cooling medium comprises engine coolant from the engine.

5. An outboard motor as set forth in claim 2 wherein there are two turbo-chargers each having a separate outlet delivering pressurized air to respective inlets to the plenum chamber.

6. An outboard motor as set forth in claim 1 wherein the intercooler has a cooling medium flowing therethrough only in a direction transverse to the direction of air flow and from one side of the plenum chamber to the other.

7. An outboard motor as set forth in claim 6 wherein the cooling medium comprises engine coolant from the engine.

8. An outboard motor as set forth in claim 7 wherein there are two superchargers each having a separate outlet delivering pressurized air to respective inlets of the plenum chamber.

* * * * *